United States Patent [19]
Whitehead et al.

[11] Patent Number: 5,642,015
[45] Date of Patent: Jun. 24, 1997

[54] ELASTOMERIC MICRO ELECTRO MECHANICAL SYSTEMS

[75] Inventors: Lorne A. Whitehead; Brent J. Bolleman, both of Vancouver, Canada

[73] Assignee: The University of British Columbia, Vancouver, Canada

[21] Appl. No.: 431,735

[22] Filed: May 1, 1995

Related U.S. Application Data

[63] Continuation-in-part of Ser. No. 91,009, Jul. 14, 1993.
[51] Int. Cl.$^6$ .................................................. H02N 1/08
[52] U.S. Cl. ................................................................ 310/309
[58] Field of Search .................................... 310/309, 328, 310/311

[56] References Cited

U.S. PATENT DOCUMENTS

| | | | |
|---|---|---|---|
| 3,772,537 | 11/1973 | Clifford et al. | 310/309 X |
| 4,376,302 | 3/1983 | Miller | 310/309 |
| 4,654,546 | 3/1987 | Kirjavainen | 307/400 |
| 4,885,783 | 12/1989 | Whitehead et al. | 381/191 |
| 4,887,248 | 12/1989 | Griebeler | 310/309 |
| 5,148,068 | 9/1992 | Kushida et al. | 310/323 X |
| 5,290,400 | 3/1994 | Bobbio | 156/655 |
| 5,359,574 | 10/1994 | Nadolink | 367/1 |
| 5,395,592 | 3/1995 | Bolleman et al. | 310/309 X |
| 5,485,437 | 1/1996 | Gregg | 310/309 X |
| 5,521,452 | 5/1996 | Gregg | 310/309 |

FOREIGN PATENT DOCUMENTS

WO95/02464  1/1995  WIPO.

OTHER PUBLICATIONS

"A Micro Membrane Pump With Electrostatic Actuation", Zengerle, et al; Proceedings of IEEE Workshop on Micro Electro Mechanical System, Travemude, Feb. 4–7, 1992; pp. 19–24.

"Fabrication of Distributed Electrostatic Micro Actuator (DEMA)", Minami et al, Journal of Microelectromechanical Systems, vol. 2, No. 3, 1 Sep. 1993, pp. 121–127.

Backman, J., and Karjalainen, M., 1990, "Audio and Ultrasonic Transducers Based on Electrothermomechanical Film (ETMF)," IEEE Intl. Conf. on Acoustics, Speech, and Signal Processing, vol. 2, pp. 1173–1176.

Backman, J., 1990, "Audio Applications of Electrothermomechanical Film (ETMF)," Journal of the Audio Eng. Soc., vol. 38, No. 5, pp. 364–371.

Savolainen, A., and Kirjavainen, K., 1989, "Electrotheromechanical Film. Part 1. Design and Characteristics," Journal of Macromol. Sci. –Chem., A26(2&3), pp. 583–591.

Carr, H., and Wykes, C., 1993, "Diagnostic Measurements in Capacitive Transducers," Ultrasonics, vol. 31, No. 1, pp. 13–20.

(List continued on next page.)

*Primary Examiner*—Mark O. Budd
*Attorney, Agent, or Firm*—Oyen Wiggs Green & Mutala

[57] ABSTRACT

An electromechanical transducer having a substrate bearing a plurality of elastomeric microstructures with a microelectrode on each microstructure. A power supply is connected to the microelectrodes for controlled application to them of an electrical potential which alternately induces forces of attraction between adjacent pairs of microelectrodes, causing controlled, time-varying displacement of the microelectrodes. Alternatively, a further plurality of microelectrodes (or one or more macroelectrodes) are elastomerically supported above the microelectrodes, with the power supply being connected to the macroelectrode(s) such that the electrical potential applied between the microelectrodes and macroelectrode(s) alternately induces forces of attraction between the microelectrodes and macroelectrode(s), causing controlled, time-varying displacement of the microelectrodes relative to the macroelectrode(s). The macroelectrode(s) can also be applied to a side of the substrate opposite the microstructures.

17 Claims, 11 Drawing Sheets

OTHER PUBLICATIONS

Hietanen, J., Stor–Pellinen, J., and Lukkala, M., 1992, "A model for an Electrostatic Ultrasonic Transducer with a Grooved Backplate," Meas. Sci. Technol., vol. 3, pp. 1095–1097.

Muro, W. S. H., and Wykes, C., 1994, "Arrays for Airborne 100 kHz Ultrasound," Ultrasonics, vol. 32, No. 1, ppp. 57–64.

Schindel, D. W., et al., 1992, "Capacitance Devices for the Generation of Air–Borne Ultrasonic Fields," IEEE Ultrasonics Symposium, pp. 843–846.

Schindel, D. W., and Hutchins, D. A., 1991, "Capacitance Devices for the Controlled Generation of Ultrasonic Fields in Liquids," 1991 IEEE Ultrasonics Symposium, pp. 301–304.

Suzuki, K., et al., 1989, "A Silicon Electostatic Ultrasonic Tranducer," IEEE Transactions on Ultrasonics, Ferroelectrics, and Frequency Control, vol. 36, No. 6, pp. 620–627.

Zengerle, R., et al., 1992, "A Micro Membrane Pump with Electrostatic Actuation," IEEE Micro Electro Mechanical Systems Workshop.

Gabriel, K. J. et al., 1992, "Surface Normal Electrostatic/Pneumatic Actuator," IEEE Micro Electro Mechanical Systems Workshop.

Fujita, H., 1989, "Studies of Micro Actuators in Japan," IEEE Robotics and Automation Int'l Conf.

Fujita, H., and Gabriel, K. J., 1991, "New Opportunities for Micro Actuators," IEEE Solid State Sensors and Actuators Int'l Conf.

Yamaguchi, M., et al., 1993, "Distributed Electrostatic Micro Actuator," IEEE Micro Electro Mechanical Systems Workshop.

Ho, Chih–Ming, and Tai, Yu–Chong, 1994, "MEMS—Science and Technology," ASME Winter Annual Meeting, Chicago, IL, Nov.

Ho, Chih–Ming, 1994, "Interaction between fluid dynamics and new technology," First International Conference on Flow Interaction, Keynote Talk, Sep. 5–9.

Hazelrigg, G.A., 1989, "Microelectromechanical devices: an overview," SPIE vol. 1167 Precision Engineering and Optomechanics.

Tsao, T. et al., 1994, "Micromachined Magnetic Actuator for Active Fluid Control," ASME Winter AnnuaL Meeting, Chicago, IL, Nov.

Wilkinson, S. P., and Balasubramanian, R., 1985, "Turbulence Burst Control Through Phase–Locked Travelling Surface Depressions," AIAA Paper No. 85–0536.

Bryzek, J., et al, 1994, "Micromachines on the March", IEEE Spectrum, May, 1994, pp. 20–31.

Minami, K. et al, 1993, "Fabrication of Distributed Electrostatic Micro Actuator (DEMA)", IEEE Spectrum, Sep., 1993, pp. 121–127.

Feynman, R., 1993 "Infinitesimal Machinery", IEEE Spectrum, Mar., 1993, pp. 4–14.

Bobbio, S.M., et al, 1993, "Integrated Force Arrays", Proc. 1993 IEEE MEMS Workshop, pp. 149–154.

Kojima, A., et al, 1991, "Effect of Gap Length on effective Field Strength", Proc. 3rd Intl. Conf. on Properties and Applications of Dielectric Materials, Jul. 8–12, 1991, Tokyo, Japan.

Kuffel, E. et al, 1984, "The Sparkling Voltage—Paschen's Law", pp. 354–361 of High Voltage Engineering Fundementals, Pergamon Press, Oxford, 1984.

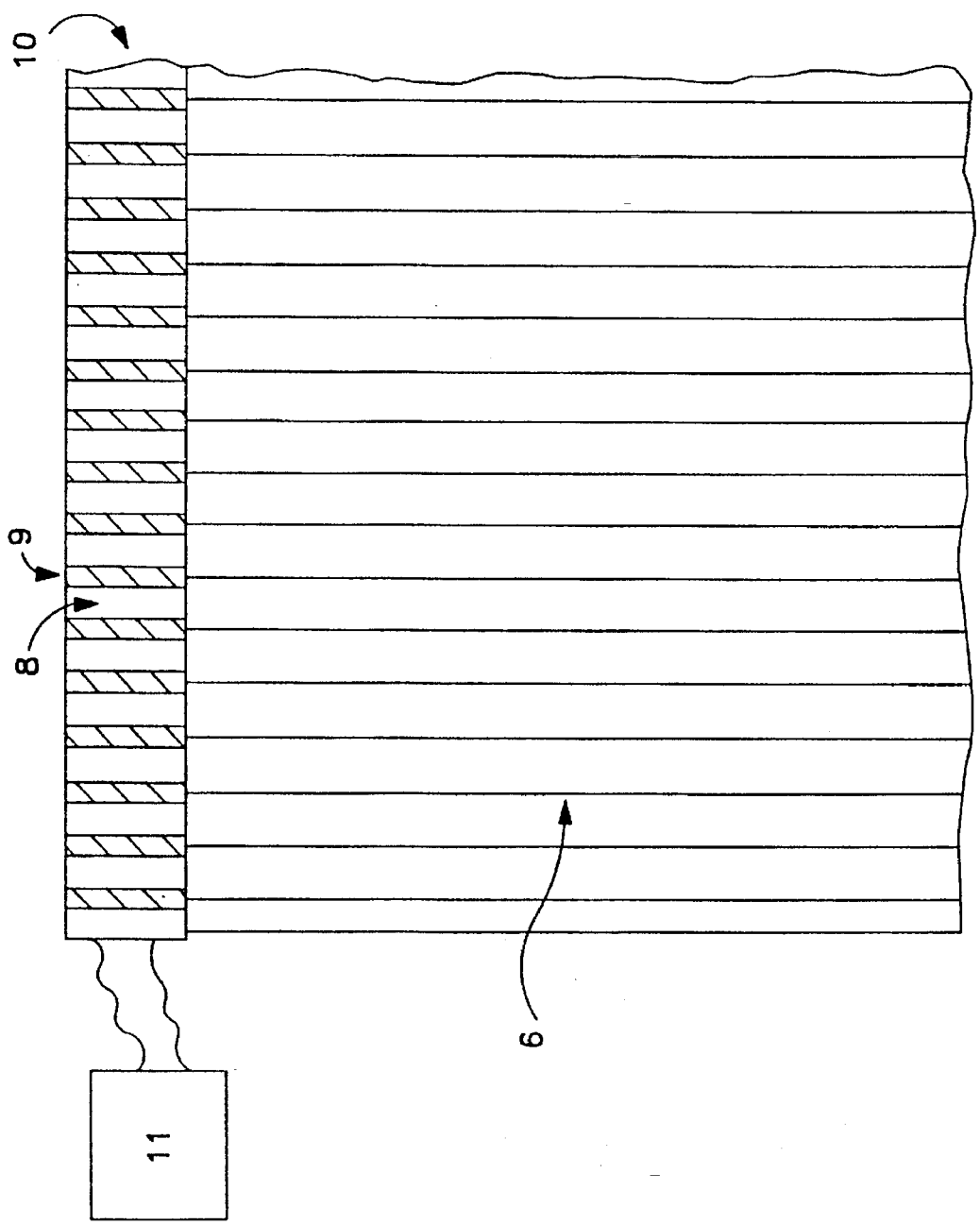
FIG. IE

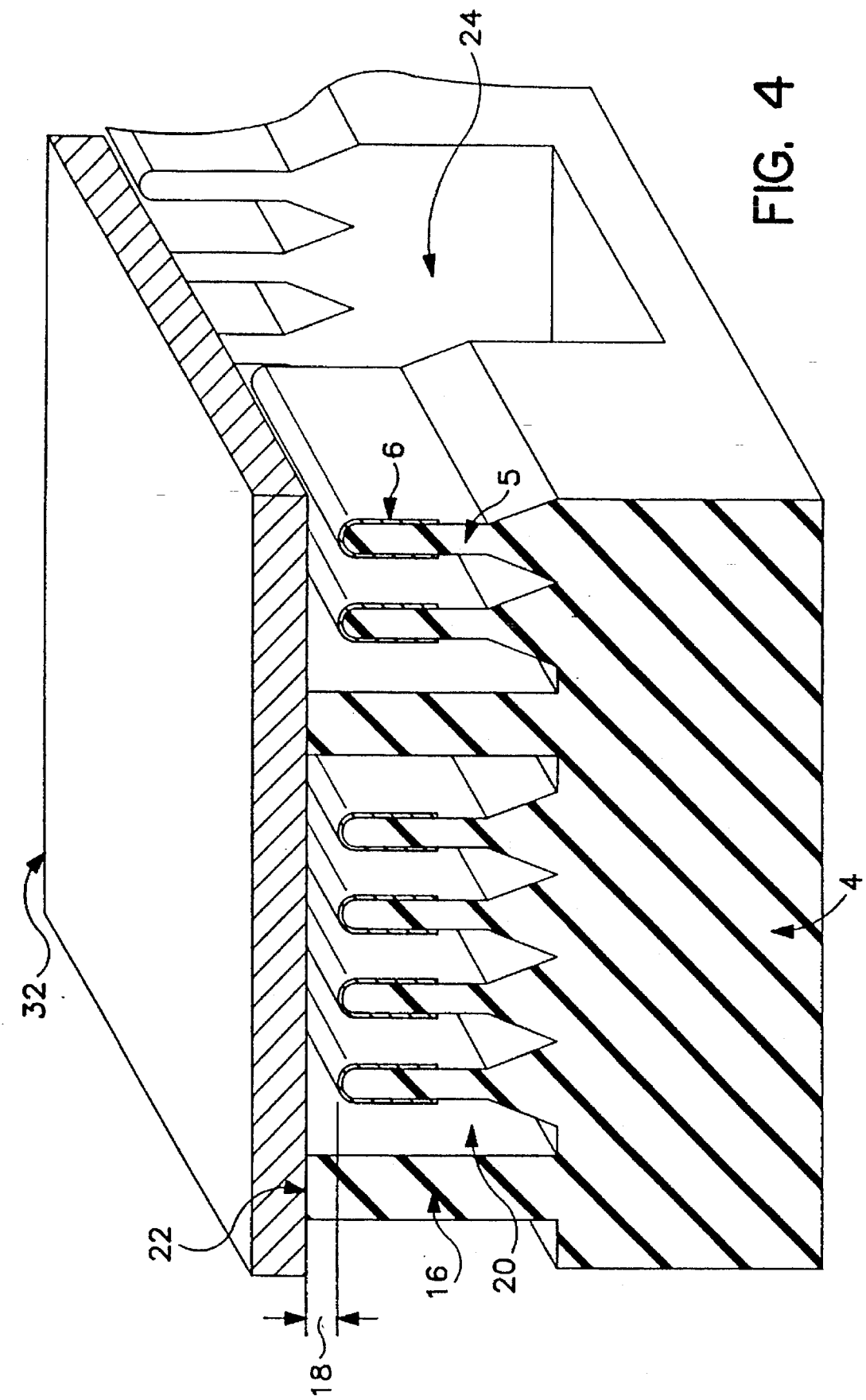

ELASTOMERIC MICRO ELECTRO MECHANICAL SYSTEMS

REFERENCE TO RELATED APPLICATION

This is a continuation-in-part of U.S. patent application Ser. No. 08/091,009 filed 14 Jul., 1993.

FIELD OF THE INVENTION

This invention relates to a microelectromechanical transducer comprising a number of microelectrodes elastically supported on an elastomeric microstructure.

BACKGROUND OF THE INVENTION

The past decade has seen rapid growth in the field of Micro Electro Mechanical Systems, which is commonly referred to by its acronym "MEMS". As the name implies, MEMS are basically micro systems which incorporate some type of electromechanical transduction to achieve a given function. In this case, "micro" refers to component features of the order micrometers. Examples of MEMS devices include micropumps, micromotors, micro-optical mirrors, etc. A recent review of the state of the art in MEMS is given in "Micromachines on the March," IEEE Spectrum, May 1994, pp. 20–31.

Many of the MEMS devices reported in the literature use electrostatic transduction. Like most electromechanical transducers, electrostatic transducers can be configured either as actuators or as sensors. When configured as actuators, which are of particular relevance to the present application, electrostatic transducers utilize the attraction of opposite charges to produce a force of attraction. For a parallel plate configuration, this force, or pressure P is readily calculable as follows:

$$P = \frac{1}{2} \epsilon_o E^2 = \frac{1}{2} \epsilon_o \left(\frac{V}{d}\right)^2 \quad (1)$$

where $\epsilon_o$ is the permittivity of air ($8.85 \times 10^{-12}$ F/m) and E is the electric field. In the case of parallel electrodes, $E = V/d$, and so the second relation may be used.

There are numerous examples in the literature of MEMS devices which utilize electrostatic actuating forces. See for example: Zengerle, R., et al., 1992, "A Micro Membrane Pump with Electrostatic Actuation," IEEE Micro Electro Mechanical Systems Workshop.; Gabriel K. J. et al., 1992, "Surface Normal Electrostatic/Pneumatic Actuator," IEEE Micro Electro Mechanical Systems Workshop; Bobbio et al., 1993, "Integrated Force Arrays," Proc. of IEEE MEMS 1993 Workshop, pp. 149–154; and, K. Minami et al., 1993, "Fabrication of Distributed Electrostatic Micro Actuator (DEMA)," J. of MEMS, Vol. 2, No. 3, 1993.

Some of the main reasons for choosing electrostatics over other methods of transduction are as follows:

(1) Energy Density: For a given voltage applied between two electrodes, the electric field increases in proportion to the decrease in separation between the electrodes. Since the electrostatic force is proportional to the square of the electric field, a single order of magnitude closer spacing of the electrodes results in two orders of magnitude greater electrostatic force for the same voltage. Cooperating with this, the electric field strength of most gases also increases rapidly with decreasing distance (see for example: H. L. Saums, "Materials for Electrical Insulating and Dielectric Functions," Hayden Book Co., 1973). Thus it is apparent that electrostatic forces scale well for use in MEMS devices.

(2) Efficiency: Electrostatic devices typically have a relatively high efficiency because they do not require the large current densities, and associated high internal resistance losses, associated with magnetic or shape memory alloy based actuators. The efficiency of an electrostatic device is especially good when the relative electrode motion is a substantial fraction of the interelectrode gap, as is often the case in MEMS devices.

(3) Cost: Unlike most other transducers, in particular piezoelectric and magnetostrictive, electrostatic transducers require only electrodes which hold the opposite electrical charges to bring about the mechanical force. It is typically much less expensive to deposit electrodes only, than to deposit both electrodes and a piezoelectric material (for example) which is then excited by the electrode.

Although electrostatic actuation mechanisms have the desirable features noted above, there are certain instances where efficiency is not so crucial, and in which it may be more advantageous to employ magnetic actuation. One advantage of magnetic actuation is the ability to achieve forces which act over a longer distance, since the force decreases only linearly with microelectrode separation, as opposed to quadratically in the case of electrostatic forces for a fixed current and potential respectively. Also, lower voltages can typically be employed in magnetically driven actuators since their performance is independent of applied voltage, and depends only on current flow. Even if efficiency is not of great concern, it is necessary to pay close attention to the dissipation of heat produced by the resistive power consumption of the microelectrodes carrying the actuating currents.

The field of MEMS appears to have arisen from two factors: curiosity to explore the limits of miniaturization of electromechanical devices (see for example Feynman, R., 1993, "Infinitesimal Machinery," J. MEMS, Vol. 2, No. 1,) and the widespread availability of micromachining equipment used in the manufacture of integrated circuits. Micromachining techniques are now quite advanced, especially with the recent addition of techniques such as LIGA, silicon fusion bonding, etc.; and allow for the construction of a wide range of devices. But, these micromachining techniques are inherently expensive per unit area, even on large volume production scales, so it appears that they may always be confined to applications which have a very high value per unit area of micromachined surface.

Another limitation of current MEMS technology is that the means for allowing relative motion between the electrodes is provided by mechanical linkages, or the bending of thin, highly cantilevered structures. For example, in the device described in the Bobbio et al. paper referenced above, the spacing between the support points which define each "cell" in the array must be reasonably large relative to the thickness of the polyamide/metal structure, due to the relatively high elastic modulus of these materials. In addition to making the design and construction of such devices quite complex, these relatively thin structures are quite fragile and are therefore not well suited for uses where durability is of concern. These and other disadvantages of prior art MEMS technology can be overcome through the use of a new type of MEMS technology called elastomeric microelectromechanical systems ("EMEMS"), as described below.

SUMMARY OF THE INVENTION

It is an object of this invention to provide a microelectromechanical device in which microelectrodes supported on an elastomeric microstructure undergo substantial relative motion in response to electrostatic forces.

Another object of the invention is to provide a microelectromechanical transducer which can be constructed inexpensively using microstructured surfaces of molded elastomeric films.

A further object of the invention is to employ a useful range of inter-electrode spacing between oppositely charged microelectrodes in EMEMS; namely less than 2 times the Paschen minimum distance for the gas and gas pressure in question.

Yet another object of the invention is to provide a means of increasing the path length over solid surfaces in mutual contact with oppositely charged microelectrodes, while simultaneously providing a means for patterning said microelectrodes and extending the flow path region.

It is yet a further object of the invention to provide a means of creating more complex structures by using facing microstructured surfaces.

These and other objects are attained by providing a microelectromechanical transducer in which microelectrodes are selectively deposited on a microstructured surface. The microelectrodes are selectively connected to a means for energizing them, such that electrostatic forces can be generated between any two oppositely charged microelectrodes, or between a microelectrode and a closely proximate macroelectrode.

The microstructures are preferably constructed using a low elastic modulus material having a high elastic strain limit, such materials typically being referred to as elastomers. This, combined with appropriate microstructural design and location of the microelectrodes, allows the electrostatic forces to cause substantial relative motion between the oppositely charged microelectrodes, or between a microelectrode and a closely proximate macroelectrode. This EMEMS design technique may offer specific performance advantages over conventional MEMS devices, such as improved durability. But, the most important advantage is expected to be greatly reduced manufacturing cost per unit area.

Fabrication of the microstructures with low modulus, high elasticity, elastomeric materials allows the microstructures to have a relatively low aspect ratio, yet still be highly flexible. By contrast, high modulus silicon microstructures used in conventional MEMS devices require a relatively high aspect ratio in order to be substantially flexible. The use of low aspect ratios facilitates use of two key manufacturing techniques. First, the microstructures may be designed in the form of moldable surface structures on a film-like elastomer sheet material. Second, a mold may be micromachined for use in microreplicating structured surface elastomer films, using known large-scale micromachining techniques such as diamond machining. Microreplication on film surfaces to produce the microstructures dramatically reduces the cost of production compared to conventional micromachining. Finally, using appropriate structural design and physical vapour deposition techniques, one may selectively deposit the microelectrodes without resorting to the expensive masking procedures commonly used in fabricating conventional MEMS devices. All of these features combine to allow EMEMS devices to be produced inexpensively using known mass production techniques.

BRIEF DESCRIPTION OF THE DRAWINGS

FIG. 1E is a top plan view of the structure shown in FIG. 1D.

FIG. 4 is similar to FIG. 3, but eliminates the upper microstructure, shows placement of gas reservoirs in the lower microstructure and a macroelectrode elastomerically supported thereabove.

DETAILED DESCRIPTION OF THE PREFERRED EMBODIMENT

Figure 1A:
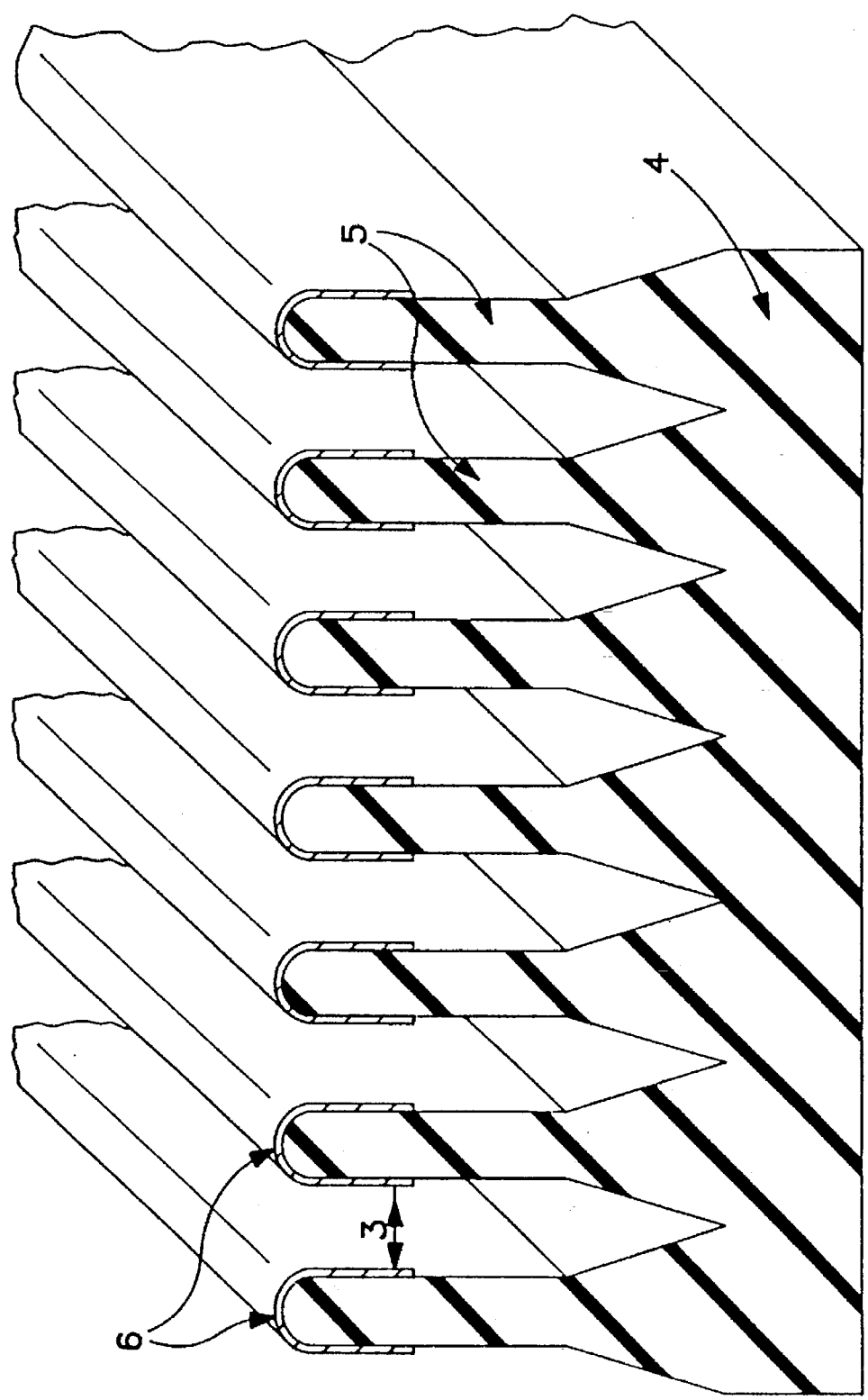
FIG. 1A is a greatly magnified, fragmented cross-sectional perspective illustration of a preferred embodiment of the invention.

FIG. 1A provides a cross-sectional perspective view of a device constructed in accordance with the preferred embodiment of the invention. The device consists of a linear array of (typically over 1,000) evenly spaced microelectrodes 6 individually supported atop microstructured elastomeric ridges 5. Microstructured elastomeric ridges 5 are formed as surface features on an elastomeric substrate film or sheet 4.

Microstructure ridges 5 can be economically produced using high volume molding microreplication techniques as is known in the art of producing microstructured surface products such as micro-prismatic optical films. Microelectrodes 6 can be formed using any one of a number of good electrically conductive materials such as pure metals (e.g. Al, Cu, Au), metal alloys, metal oxides (e.g. indium tin oxide), superconductors, conductive polymers, shape memory alloys, or conductive elastomers.

In cases where the strain required of the conductive material is relatively high, it may be desirable to utilize a conductive elastomer material for the microelectrode to reduce the risk of mechanical fatigue failures which might result in breaks in the conductivity of the microelectrodes. A preferred technique for deposition of microelectrodes 6 atop ridges 5 is hereinafter described in more detail.

An important object of the FIG. 1A device is to achieve harmonic motion of microelectrodes 6 at a given frequency f and as a function of time t, in a direction substantially parallel to the plane of microstructured sheet 4. Such motion could be useful for a number of fluid dynamic applications such as boundary layer control, where it is desirable to control microscale aspects of a fluid-surface interaction to affect macroscale flow in a substantial manner. For example, this effect could be used to increase the level of fluid mixing in a boundary layer and thereby increase its momentum exchange. Under certain electrical drive conditions the effect might also be usefully employed to reduce the level of turbulent mixing and thereby reduce surface drag on an aerodynamic body such as an aircraft. The use of micromechanical devices for interaction with fluid flows is discussed in more detail in references such as Ho, Chih-Ming, "Interaction Between Fluid Dynamics And New Technology," First International Conference on Flow Interaction, Keynote Talk, Sep. 5–9, 1994.

The means by which the desired harmonic motion of microelectrodes 6 is attained will now be described with reference to FIGS. 1B and 1C. One of four unique electrical driving potential functions a, b, c or d is applied to each microelectrode 6, where:

$$a=+V \quad b=+V \sin(2\pi ft)$$
$$c=-V \quad d=-V \sin(2\pi ft)$$

Figure 1B:
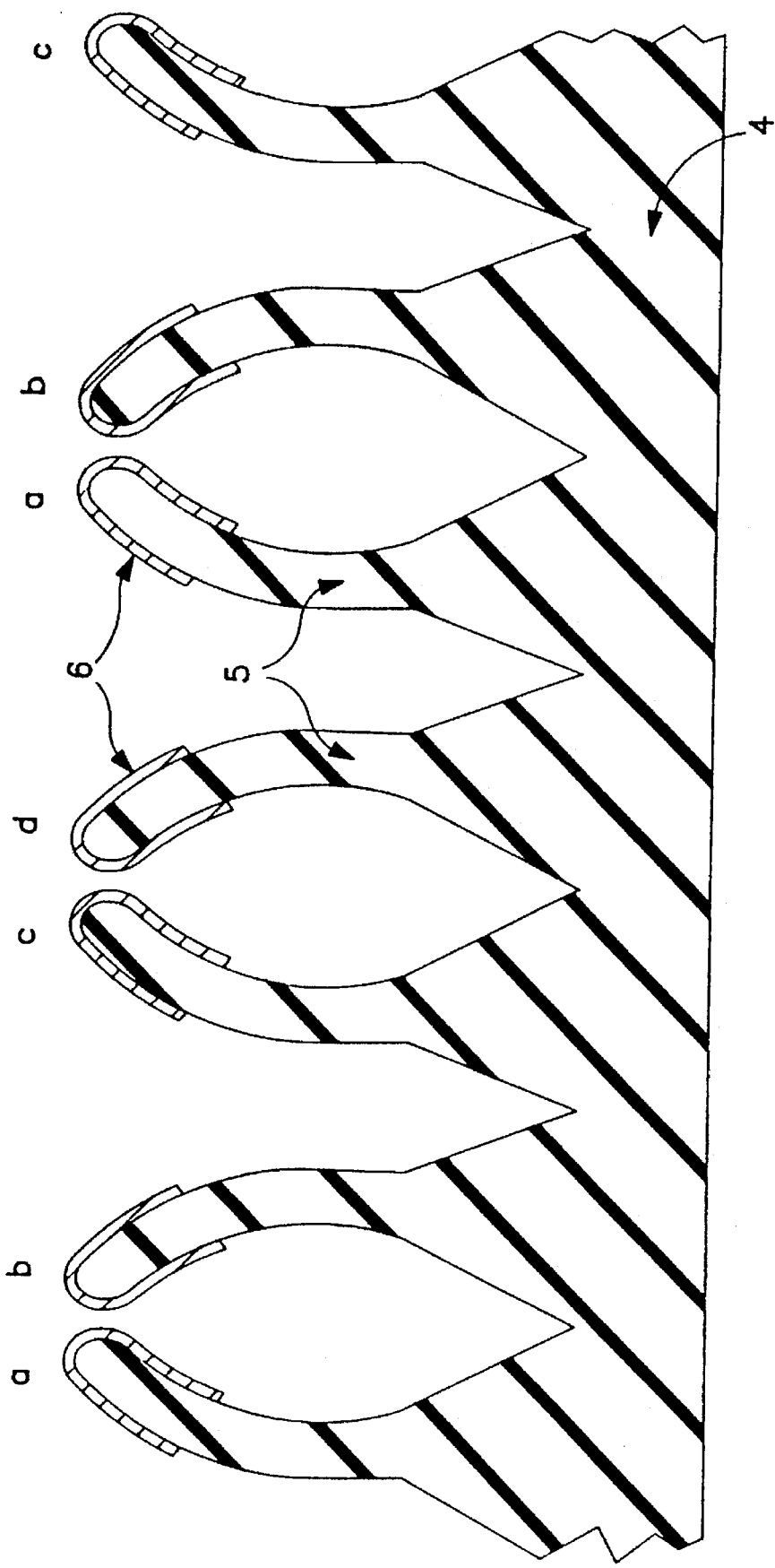
FIG. 1B is a fragmented cross-sectional elevation of the structure depicted in FIG. 1A, showing one position of the microelectrodes when in a state of excitation caused by the application of the labelled potentials.
Figure 1C:
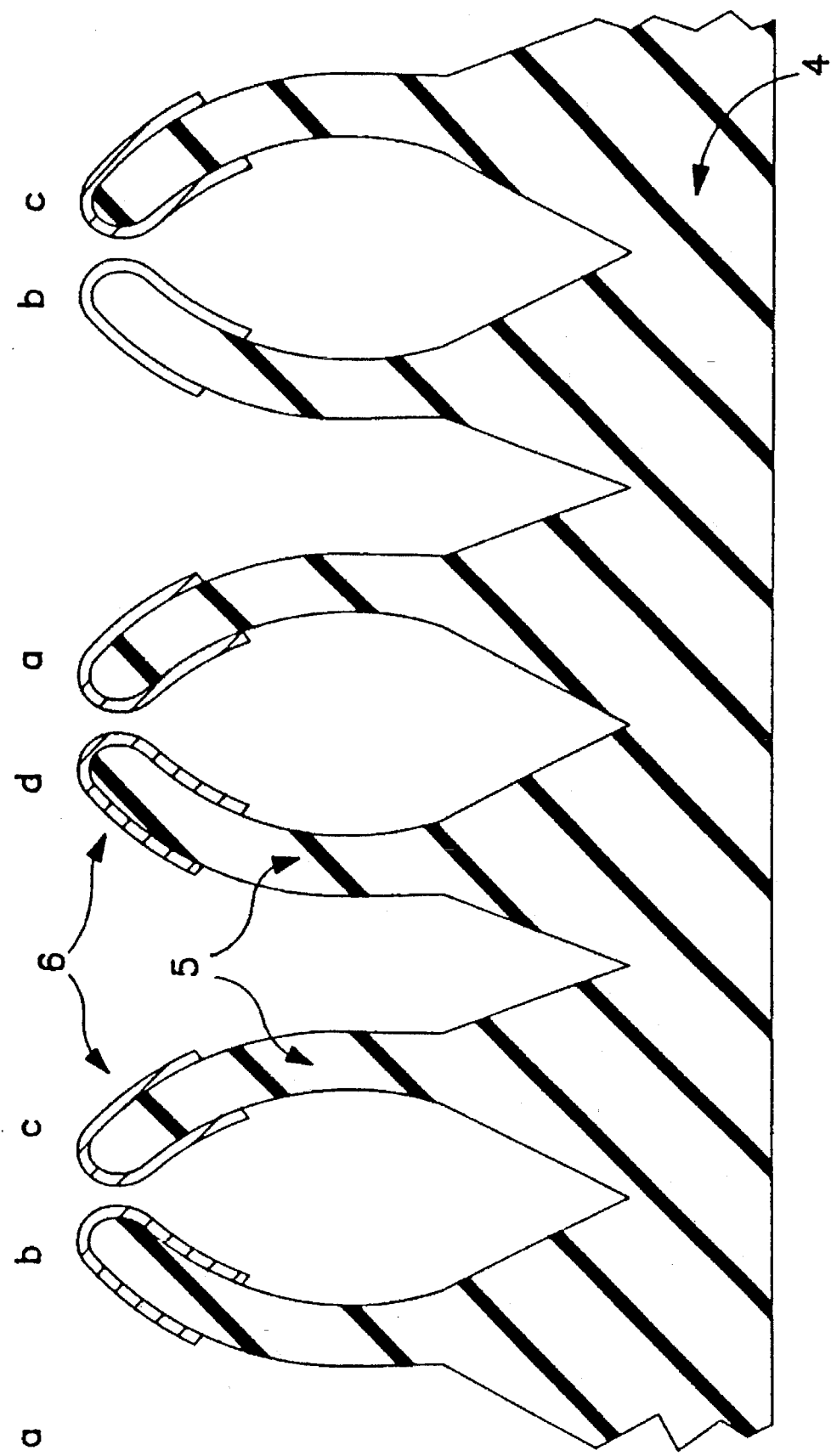
FIG. 1C is a fragmented cross-sectional elevation of the structure depicted in FIG. 1A, showing a second position of the microelectrodes when in a second state of excitation caused by the application of the labelled potentials.

These functions are applied in turn to adjacent microelectrodes in a repeating manner as shown in FIG. 1B. Electrostatic forces generated by this sequence of driving potentials causes motion of microelectrodes 6 via deformation of their supporting microstructured elastomeric ridges 5 in the following manner. At time t=0, microelectrodes 6 are in the undeformed state shown in FIG. 1A. At t=1/(4f), microelectrodes 6 are in a state of maximum deformation as shown in FIG. 1B. At t=1/(2f), microelectrodes 6 will pass through the undeformed state shown in FIG. 1A. Finally, at t=3/(4f), microelectrodes 6 will be at the opposite state of maximum deformation shown in FIG. 1C. This pattern of motion is repeated at the frequency f and thereby achieves the desired operation. It will thus be understood that the applied electrical potential alternately induces forces of attraction between adjacent pairs of microelectrodes 6, causing controlled, time-varying displacement of the microelectrodes.

Preferably, each of microelectrodes 6 has an individual cross-sectional area less than 0.01 mm$^2$; and, the displacement exceeds one percent of the square root of such cross-sectional area.

Figure 1D:
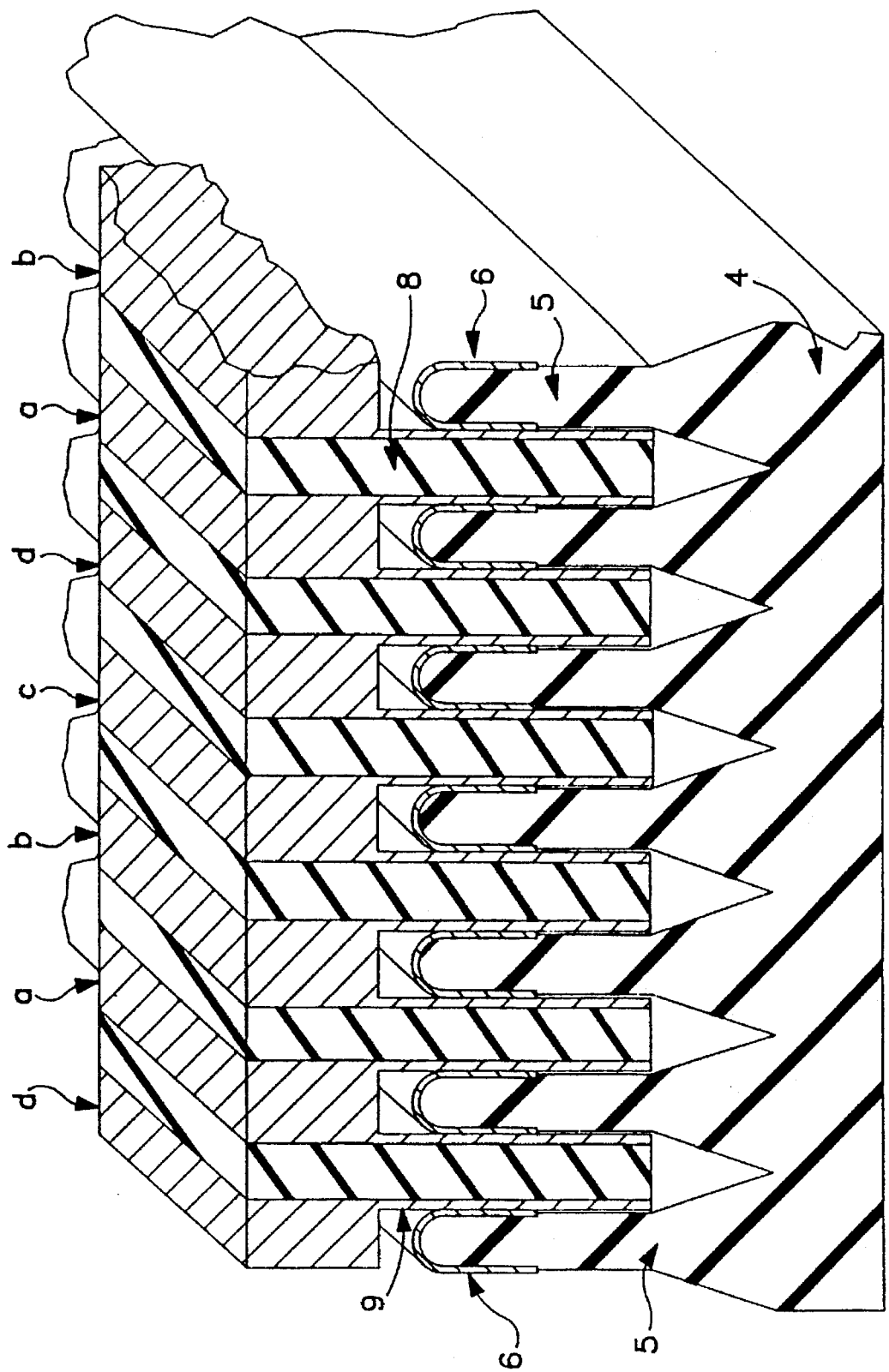
FIG. 1D depicts the structure of FIG. 1A with the addition of a connection means for making electrical contact with each individual microelectrode.

An edge connecting strip 10 can be used to electrically connect microelectrodes 6 to an appropriate power supply 11, as shown in FIGS. 1D and 1E. Connecting strip 10 consists of a number of protruding microstructured ridges 8 which separate and support inverted "U" shaped electrical contacts 9. Ridges 8 are geometrically configured for simultaneous insertion between microstructured elastomeric ridges 5. The geometry is made such that the clearance between the interleaving series of ridges 5, 8 is sufficient to allow relatively easy insertion, yet still provide good electrical contact between contacts 9 and the adjacent surfaces of the respective microelectrodes 6.

Each one of inverted "U" shaped electrical contacts 9 forms part of an electrically conductive path which carries the appropriate drive signal (i.e. a, b, c, or d) from power supply 11. This can easily be achieved by applying a micropatterned wiring scheme to connecting strip 10 using well known integrated circuit fabrication technology such as photolithography. Since microelectrodes 6 and contacts 9 are in intimate contact, a good electrical connection can be achieved, possibly with the assistance of a conductive viscous material such as gel applied to one of the surfaces prior to interleaving them as aforesaid. A suitably high electric field strength dielectric material such as polyimide is used to form the bulk of each ridge 8 and to electrically isolate the adjacent conduction paths.

The maximum electrostatic force which can be generated between microelectrodes 6 is limited by electrical breakdown between adjacent electrodes. Although the inventors do not wish to be bound by any particular theories, it seems likely that there are in general three primary modes of electrical breakdown in an EMEMS device like that described above.

The first primary mode of electrical breakdown is surface discharge across the elastomer surface between microelectrodes 6 and/or the planar electrode. A number of mechanisms such as carbonization can cause surface discharge across otherwise non-conducting surfaces. In most cases, the probability of surface discharge increases with increasing voltage per unit path length. Thus, it is desirable to make the path length as long as possible. This is achieved in the structure of the preferred embodiment by virtue of the long path length "S" (FIG. 2A) required to traverse the recesses between microelectrodes 6 atop elastomeric ridges 5 (See FIG. 2A).

The second primary mode of electrical breakdown is avalanche breakdown of the gas within the inter-electrode gaps. Avalanche breakdown of the gas occurs when the voltage exceeds that of the Paschen curve values for the given gas in question. Paschen curves may be determined by reference to works such as Kuffel, E. et al, "The Sparking Voltage—Paschen's Law", pp. 354–361 in High Voltage Engineering Fundamentals, Pergamon Press, Oxford, 1984. Paschen's law states that the maximum voltage V attainable without avalanche breakdown is a function only of the product of gas pressure p and gap spacing d; namely V=f(pd). Thus, it is desirable to make the inter-electrode gap 3 (FIG. 1A) as small as possible to prevent gaseous breakdown. However, this must be balanced against the fact that a reduction in the inter-electrode gap 3 also reduces the maximum displacement of microelectrodes 6, which may limit the usefulness of the device. Certain types of gases, in particular electronegative gases such as sulphur hexafluoride, exhibit a substantially higher resistance to avalanche breakdown than air and may provide a useful means of increasing dielectric strength.

The third primary mode of electrical breakdown is field emission. Field emission is the tunnelling of electrons through the potential barrier at a surface which in turn leads to a number of breakdown mechanisms. In theory, the potential barrier is too great to allow substantial tunnelling until fields of the order 3000 MV/m are reached. However, in practice, substantial field emission can begin to occur at nominal electric fields up to two orders of magnitude lower than this (i.e. 30 MV/m). It appears that the weakness is due to the large number of microprotrusions which are inherent in the surface roughness of even highly polished surfaces. These microprotrusions can increase the local electric field by two orders of magnitude and thus lead to a field emission breakdown. Therefore, in order to prevent field emission, one must use a means for minimizing surface roughness. There is also evidence suggesting that the inter-electrode spacing (which affects the total voltage applied across the gap) can also play a role, in addition to the magnitude of the electric field (see for example A. Kojima et al, "Effect of Gap Length on Effective Field Strength", Proc. 3rd Intl. Conf. on Properties and Applications of Dielectric Materials, Jul. 8–12, 1991, Tokyo, Japan). This further suggests that the inter-electrode gap should be made as small as practical.

Overall, the breakdown mechanism which is the weak link will depend on a number of factors such as the surface path length, inter-electrode gap, dielectric gas type, electrode surface, etc. For example, if one were to operate the device described above in a high vacuum environment, the gaseous breakdown mechanism would be substantially eliminated and there would only be surface discharge and field emission to contend with. As a general rule of thumb, it is desirable to make the inter-electrode spacing less than 2 times the Paschen minimum distance for the gas and gas pressure in question. This will generally ensure substantial electrostatic force is obtainable without gaseous breakdown or the need for excessively high operating voltages.

The method by which microelectrodes 6 are selectively deposited atop ridges 5 will now be described. As described above, it is desirable to selectively deposit microelectrodes 6 on only certain parts of ridges 5, in a manner which is inexpensive on a large production scale. One such method is to use the directional nature of physical vapour deposited atoms in combination with the microstructure of the elastomer to produce a microshadowing effect. Microshadowing techniques have been used elsewhere in the art, for example in the devices described by Bobbio et al. in "Integrated Force Arrays," Proc. 1993 IEEE MEMS Workshop, p. 150.

Figure 2A:
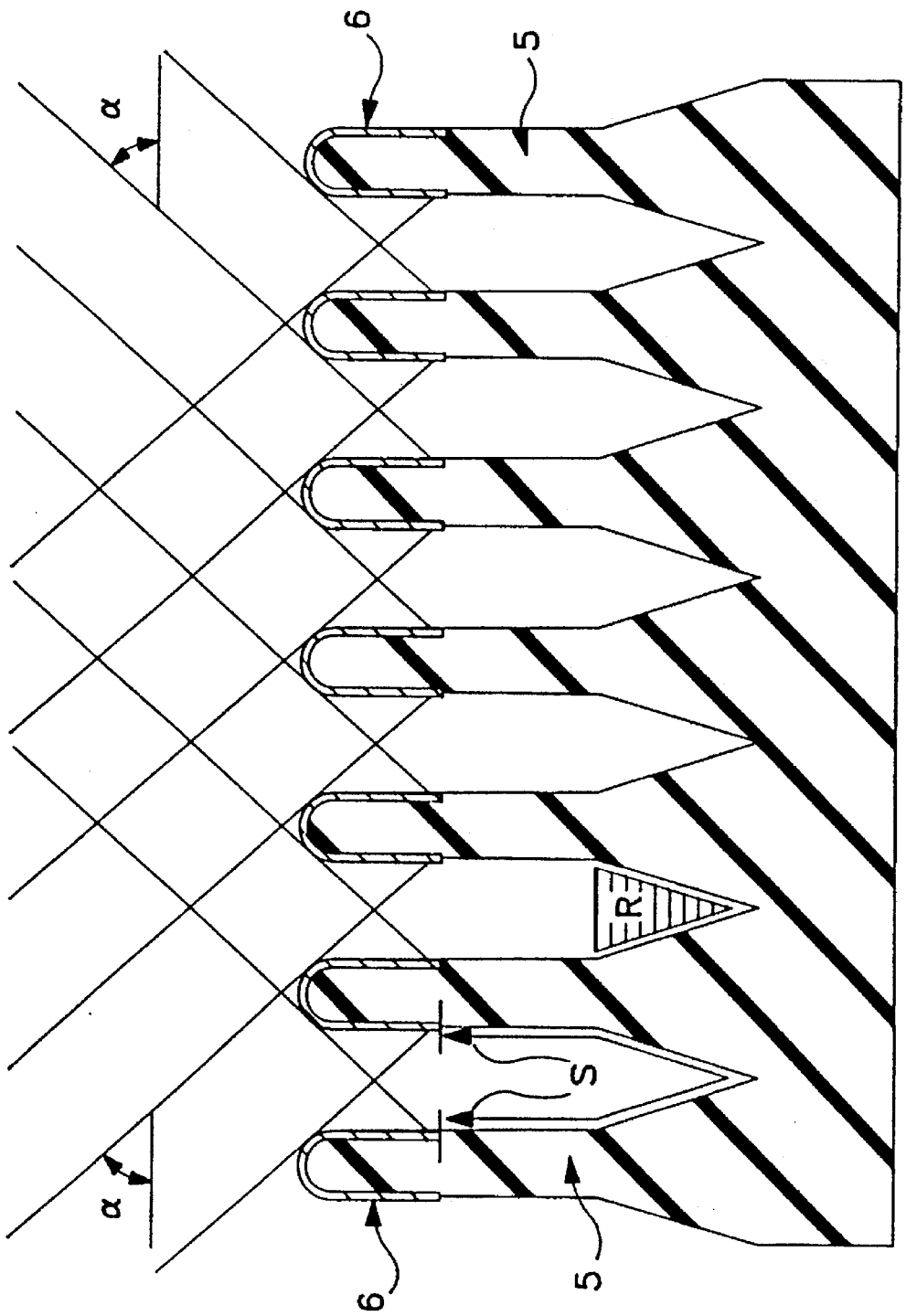
FIG. 2A is a cross-sectional elevation of the structure depicted in FIG. 1A, and illustrates how microstructural design principles can be used to achieve various objects of the invention.
Figure 2B:
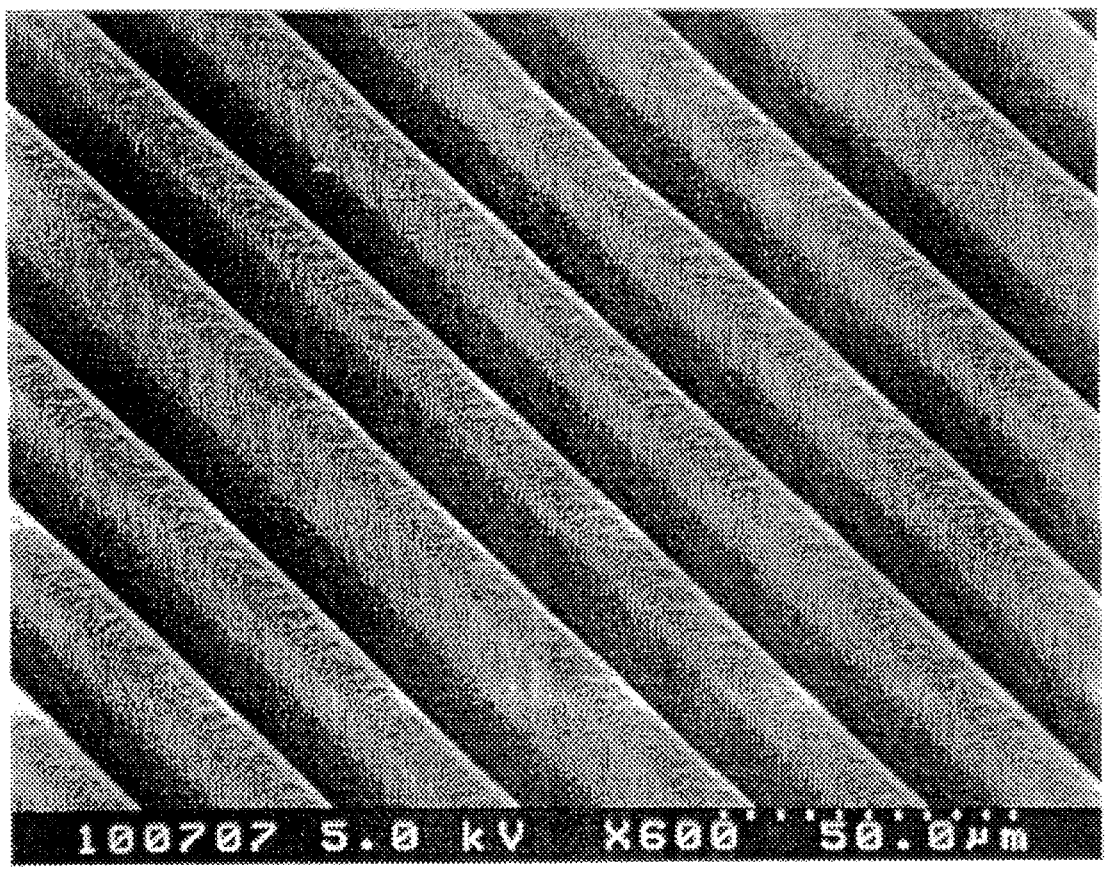
FIG. 2B is a scanning electron micrograph showing a metal coated elastomer microstructure constructed in accordance with the invention.

Referring to FIG. 2A, microshadowing can be achieved by projecting metal atoms in a direction perpendicular to ridges 5 at an angle α which is sufficient to cause the degree of shadowing desired. In FIG. 2A a projection angle α of 45° is shown. This provides a relatively long surface breakdown path length, while producing a smooth transition to the electric field near the tip of ridge 5. Smaller angles would confine the metal to a smaller region atop ridges 5, but the edges of such smaller regions could produce very high electric fields which might be a source of electrical breakdown. FIG. 2B is a scanning electron micrograph taken at an oblique angle to the microstructured surface of a device constructed in accordance with the preferred embodiment described above. In this micrograph, the light shaded regions 32 represent the tantalum metal coating, and the dark regions 33 represent the silicone elastomer.

Figure 3:
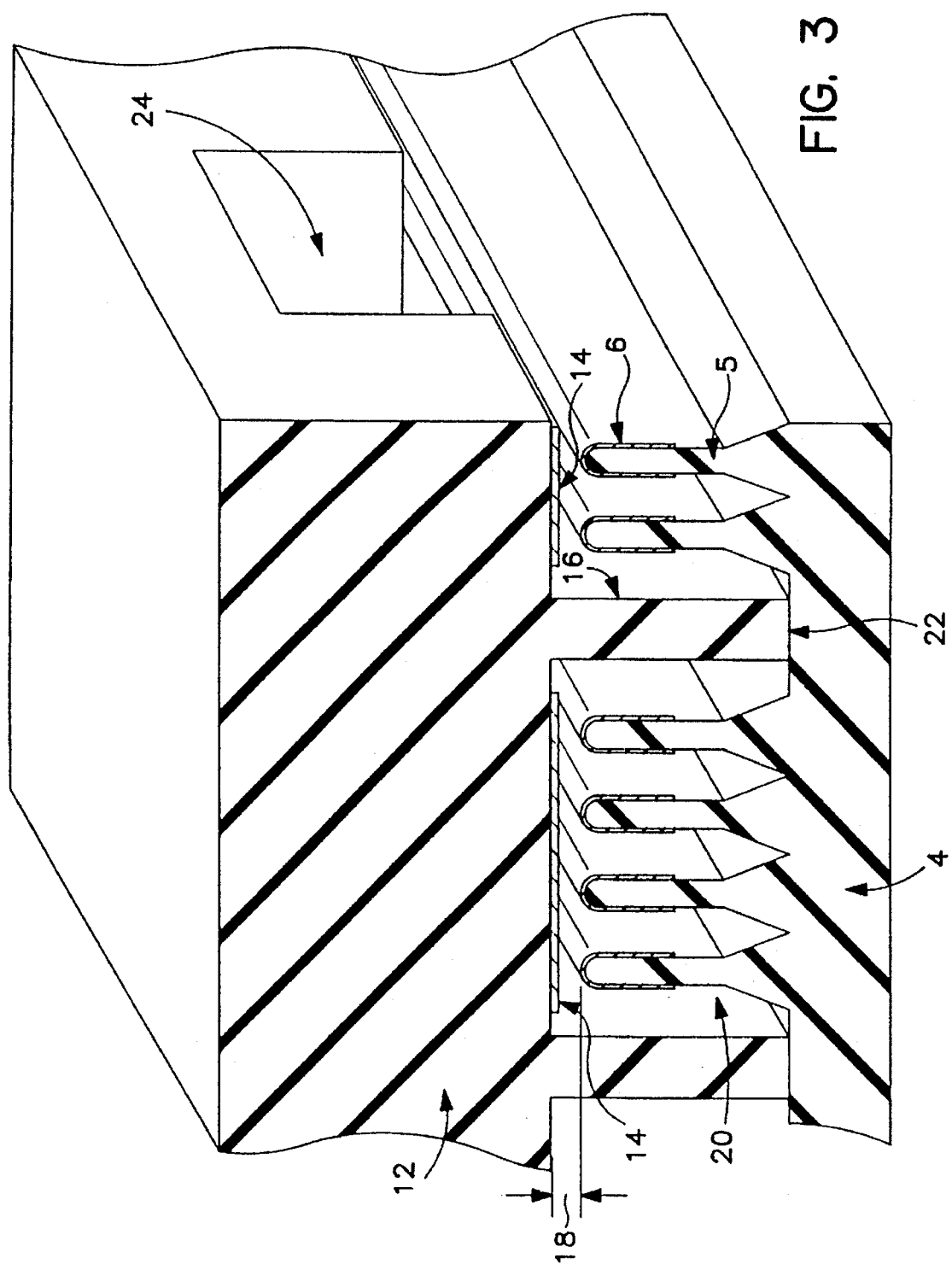
FIG. 3 depicts a greatly magnified pair of opposed microstructured surfaces which provide a plurality of gas reservoirs.

In some cases it may be desirable to utilize two microstructured surfaces which are facing one another, and are in mutual contact. A small exemplary portion of one such embodiment is shown in FIG. 3. The lower part of FIG. 3 depicts an elastomeric microstructured substrate 4 bearing a first plurality of elastomeric ridges 5, each one of which is capped by a first microelectrode 6 as described above with reference to FIG. 1A. The upper part of FIG. 3 depicts a second elastomeric microstructured substrate 12 to which a second plurality of microelectrodes 14 are attached, such that each microelectrode 14 faces a corresponding plurality of microelectrodes 6. The scale of FIG. 3 is distorted; in practice, the depth of the upper elastomeric microstructured substrate 12 is very much larger than the depth of the lower elastomeric microstructured substrate 4.

A series of elastomeric ridges 16 protrude downwardly from upper microstructured substrate 12 to contact lower microstructured substrate 4 at regular intervals, thus defining an interelectrode gap spacing 18 between microelectrodes 6, 14. A gas, such as air, fills the space 20 enclosed by the two microstructured substrates. An adhesive bond is preferably applied at each point of contact 22 between the two microstructures. Microelectrodes 14 are connected to one terminal of a voltage source, and the facing microelectrodes 6 are connected to the other terminal. The upper microstructured substrate 12 is recessed at regular intervals to provide a plurality of gas reservoirs 24 for the purpose explained below.

Operation of the FIG. 3 embodiment is as follows: a potential difference is applied between the two sets of microelectrodes 6, 14 generating an electrostatic force of attraction between them. This electrostatic force of attraction deforms elastomeric ridges 16, allowing the two sets of microelectrodes to move relative to one another. As the microelectrodes move, the gas confined within space 20 is compressed between the upper and lower microstructures. The gas compression is greater between microelectrodes 6, 14 than within reservoirs 24, so the gas tends to be forced into and out of reservoirs 24. Thus, the overall gas compression is less than it would be if reservoirs 24 were not provided. Reservoirs 24 accordingly reduce undesirable impedance to the relative motion of the two microstructures due to the compressive stiffness of the gas within space 20; and, they avoid the need to construct the lower microstructure with a high aspect ratio, which is difficult to do.

Gas flow into and out of reservoirs 24 introduces viscous damping which is undesirable in many circumstances. To minimize viscous damping, the flow speed of the fluid moving into and out of reservoirs 24 should be minimized. This can be achieved, for example, by spacing reservoirs 24 more closely so that less fluid volume needs to be moved; or, by increasing the cross-sectional area to reduce the average fluid flow speed. Referring again to FIG. 2A, the added cross-sectional area associated with recessed region "r" is useful to enable this second approach, in addition to its use for the other previously mentioned functions of increasing surface breakdown path length and enabling microshadowing of microelectrodes 6.

FIG. 4 depicts an alternative to the FIG. 3 device, which eliminates the need for the upper microstructure. As seen in FIG. 4, one or more macroelectrodes 32 (being planar structures having dimensions on the order of millimeters) are supported above microelectrodes 6 on elastomeric ridges 16 which protrude upwardly from substrate 4. Gas reservoirs 24 are created by removing selected portions of substrate 4 and elastomeric ridges 5. In operation, a potential difference is applied between microelectrodes 6 and macroelectrode(s) 32, generating an electrostatic force of attraction between them. This electrostatic force of attraction deforms elastomeric ridges 16, allowing the microelectrodes and macroelectrode(s) to move relative to one another. During such movement, the gas confined within space 20 is compressed between the macroelectrode(s) and substrate 4.

Figure 5A:
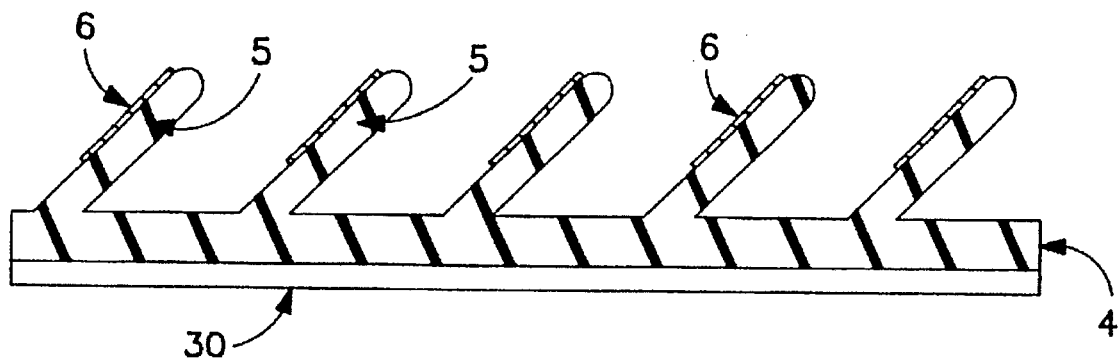
FIGS. 5A and 5B depict an embodiment having a macroelectrode beneath the embodiment of FIG. 1.
Figure 5B:
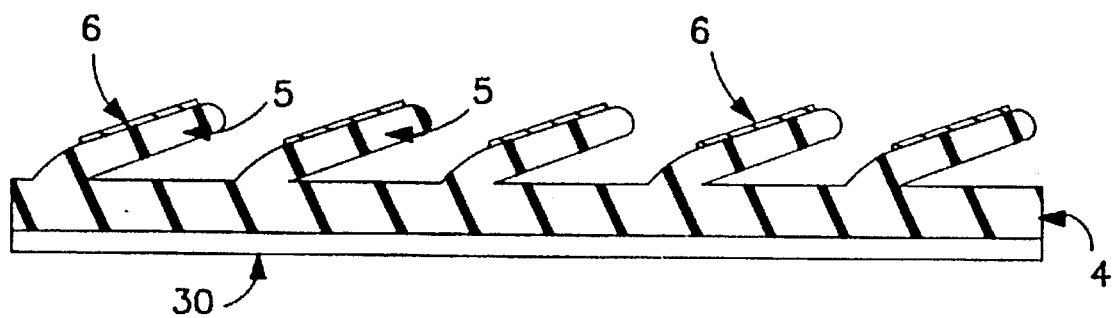

FIGS. 5A and 5B depict a further alternative embodiment in which one or more macroelectrodes 30 are applied to the base of substrate 4. In operation, a potential difference is applied between microelectrodes 6 and macroelectrode(s) 30, generating an electrostatic force of attraction between them. This electrostatic force of attraction deforms elastomeric ridges 5, allowing microelectrodes 6 to move relative to macroelectrode(s) 30 as seen in FIG. 5B.

Figure 6:
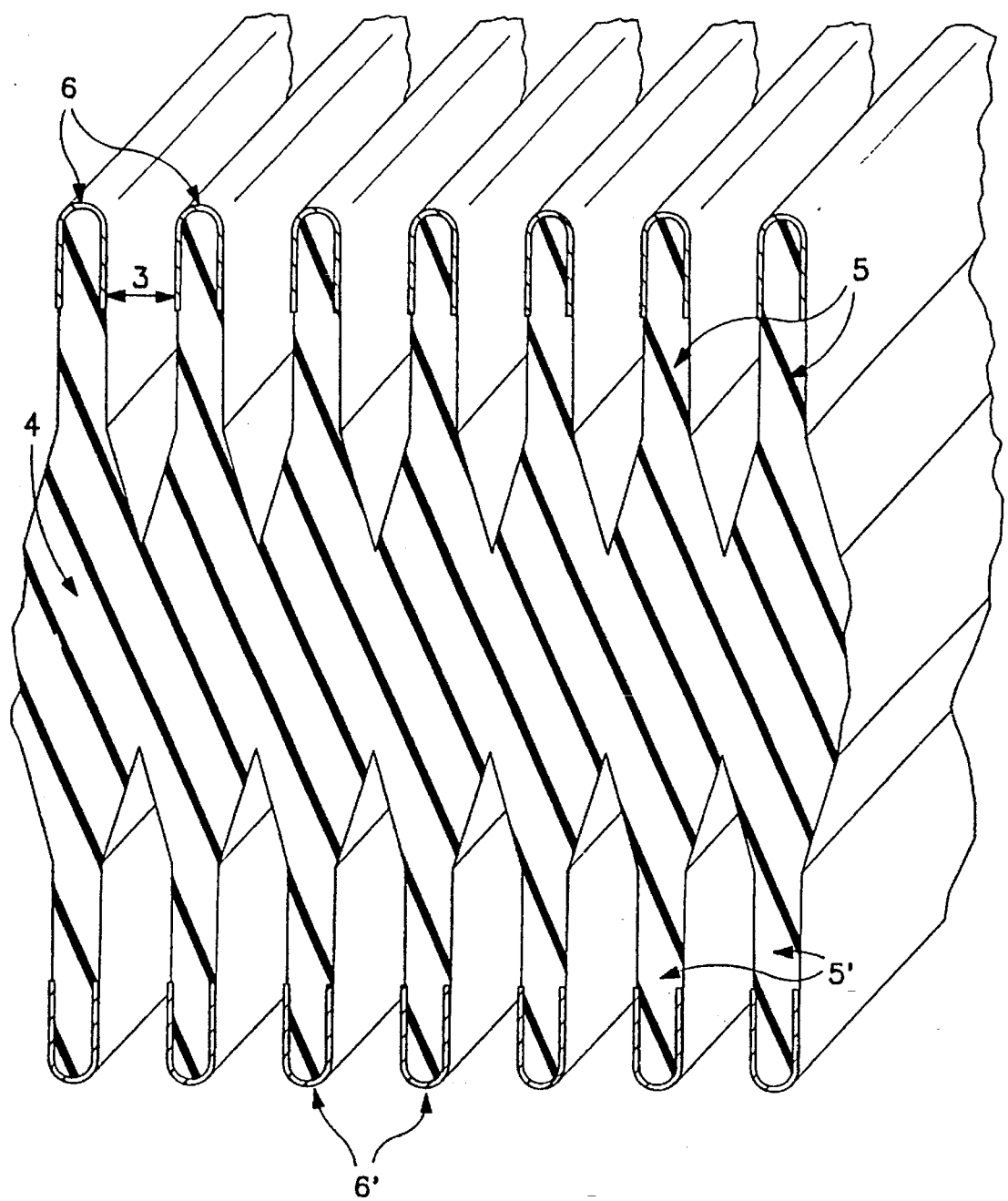
FIG. 6 depicts an embodiment similar to that of FIGS. 1A–1D, in which microelectrode-bearing elastomeric microstructures are provided on both sides of a planar substrate.

FIG. 6 depicts a still further alternative embodiment in which microelectrodes 6, 6' are applied to both sides of substrate 4. It will be noted that this provides upper and lower structures (symmetrical about the plane of substrate 4), each of which functions in the manner described above with respect to FIGS. 1A–1D. Such a double-sided structure could be useful, for example, in improving convention heat transfer through a membrane.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electromechanical transducer, comprising:
   (a) a first substrate bearing a first plurality of elastomeric microstructures on one side of said substrate;

(b) a first microelectrode on each one of said first plurality of microstructures; and, (c) power supply means electrically connected to said microelectrodes for controlled application of an electrical potential to said microelectrodes.

2. An electromechanical transducer as defined in claim 1, wherein said electrical potential alternately induces forces of attraction between adjacent pairs of said microelectrodes, causing controlled, time-varying displacement of said microelectrodes.

3. An electromechanical transducer as defined in claim 1, further comprising one or more macroelectrodes on an opposed side of said substrate, wherein:

(a) said power supply means is further electrically connected to said one or more macroelectrodes; and, (b) said electrical potential alternately induces forces of attraction between said microelectrodes and said one or more macroelectrodes, causing controlled, time-varying displacement of said microelectrodes relative to said one or more macroelectrodes.

4. An electromechanical transducer as defined in claim 1, further comprising one or more macroelectrodes elastomerically supported above said microelectrodes, wherein:

(a) said power supply means is further electrically connected to said one or more macroelectrodes; and, (b) said electrical potential alternately induces forces of attraction between said microelectrodes and said one or more macroelectrodes, causing controlled, time-varying displacement of said microelectrodes relative to said one or more macroelectrodes.

5. An electromechanical transducer as defined in claim 1, wherein said first plurality exceeds 1,000.

6. An electromechanical transducer as defined in claim 1, wherein:

(a) said first substrate is an elastomeric sheet material; and, (b) said microstructures are formed as integral surface features of said sheet material.

7. An electromechanical transducer as defined in claim 1, further comprising:

(a) a second substrate bearing a second plurality of elastomeric microstructures, said second substrate adjacent to and facing said first substrate, with said second plurality of elastomeric microstructures contacting said first substrate; and, (b) a second plurality of microelectrodes on said second substrate;

wherein said power supply means is further electrically connected to said second microelectrodes for controlled application of said electrical potential to said second microelectrodes to alternately induce forces of attraction between said first and second pluralities of microelectrodes, causing controlled, time-varying displacement of said first and second pluralities of microelectrodes.

8. An electromechanical transducer as defined in claim 1, further comprising:

(a) a second substrate bearing a second plurality of elastomeric microstructures, said second substrate adjacent to and facing said first substrate, with said second plurality of elastomeric microstructures contacting said first substrate; and, (b) one or more macroelectrodes supported above said microelectrodes by said second plurality of elastomeric microstructures;

wherein said power supply means is further electrically connected to said one or more macroelectrodes for controlled application of said electrical potential to said one or more macroelectrodes to alternately induce forces of attraction between said microelectrodes and said one or more macroelectrodes, causing controlled, time-varying displacement of said microelectrodes relative to said one or more macroelectrodes.

9. An electromechanical transducer as defined in claim 1, wherein:

(a) adjacent pairs of said first microelectrodes are separated by a gas-filled gap, said gas characterized by a Paschen minimum distance "d" at a particular gas pressure; and, (b) said gap width is less than twice said Paschen minimum distance "d".

10. An electromechanical transducer as defined in claim 1, wherein said first microelectrodes comprise an electrically conductive elastomer.

11. An electromechanical transducer as defined in claim 1, wherein said microstructures are geometrically configured for directional deposition of electrically conductive material on said microstructures to form said microelectrodes as a predetermined micro-pattern of surface deposits on said microstructures.

12. An electromechanical transducer as defined in claim 1, further comprising a recess between each adjacent pair of said first plurality of said microstructures, each of said recesses defining a surface path length between said first microelectrodes on said adjacent microstructures, said surface path length substantially exceeding any direct path distance between said first microelectrodes on said adjacent microstructures.

13. An electromechanical transducer as defined in claim 7, further comprising a plurality of gas flow reservoirs in said second substrate for gas flow from between said microelectrodes into and out of said reservoirs during said displacement of said microelectrodes.

14. An electromechanical transducer as defined in claim 4, further comprising a plurality of gas flow reservoirs in said first substrate for gas flow from between said microelectrodes into and out of said reservoirs during said displacement of said microelectrodes.

15. An electromechanical transducer as defined in claim 1, wherein said microelectrodes have individual cross-sectional area less than 0.01 $mm^2$.

16. An electromechanical transducer as defined in claim 2, wherein said microelectrodes have individual cross-sectional area less than 0.01 $mm^2$ and said displacement exceeds one percent of the square root of said cross-sectional area.

17. An electromechanical transducer as defined in claim 1, further comprising:

(a) a second plurality of elastomeric microstructures on an opposed side of said substrate; and, (b) a second microelectrode on each one of said second plurality of microstructures;

wherein said power supply means is further electrically connected to said second microelectrodes for controlled application of an electrical potential to said second microelectrodes.

* * * * *